United States Patent [19]

Gasiewski

[11] Patent Number: 5,231,404
[45] Date of Patent: Jul. 27, 1993

[54] DUAL-POLARIZED CROSS-CORRELATING RADIOMETER AND METHOD AND APPARATUS FOR CALIBRATING SAME

[75] Inventor: Albin J. Gasiewski, Atlanta, Ga.

[73] Assignee: Georgia Tech Research Corporation, Atlanta, Ga.

[21] Appl. No.: 847,349

[22] Filed: Mar. 6, 1992

Related U.S. Application Data

[63] Continuation-in-part of Ser. No. 702,044, May 17, 1991, abandoned.

[51] Int. Cl.⁵ .............................................. G01B 3/02
[52] U.S. Cl. .................................. 342/351; 342/362; 342/174
[58] Field of Search .............. 342/361, 362, 174, 351, 342/360; 343/703

[56] References Cited

U.S. PATENT DOCUMENTS

| | | |
|---|---|---|
| 4,282,525 | 8/1981 | Gustincic et al. . |
| 4,864,315 | 9/1989 | Mohuchy ........................ 343/703 |
| 5,034,750 | 7/1991 | Cardiasmenos .................. 342/188 |
| 5,068,668 | 11/1991 | Tsuda et al. ..................... 342/362 |

Primary Examiner—Theodore M. Blum
Attorney, Agent, or Firm—Deveau, Colton & Marquis

[57] ABSTRACT

A dual linearly-polarized cross-correlating radiometer including an apparatus for calibrating the cross-correlating channel of the radiometer is described. The apparatus for calibrating the cross-correlating channel comprises a first calibration load, a second calibration load positioned perpendicularly thereto, and means for rotating the calibration loads relative to the feedhorn of the radiometer. The calibration loads are moved through several angular positions and the output voltages of the cross-correlating channel are measured at the various angular positions and used to estimate the gains and offset of the cross-correlating channel.

28 Claims, 5 Drawing Sheets

DUAL-POLARIZED CROSS-CORRELATING RADIOMETER AND METHOD AND APPARATUS FOR CALIBRATING SAME

This is a continuation-in-part of copending application Ser. No. 07/702,044 filed on May 17, 1991 now abandoned.

TECHNICAL FIELD

The present invention relates generally to passive microwave remote sensing, and particularly to spaceborne and airborne radiometers.

BACKGROUND OF THE INVENTION

In recent years, the science of microwave radiometry has distinguished itself as a part of the general field of environmental remote sensing. Microwave radiometry also has taken on a new name, "passive microwave remote sensing", in contrast to radar, which has come to be known as "active microwave remote sensing." A microwave radiometer is a highly sensitive receiver typically used in radiometry for measuring low levels of microwave radiation. When an object or scene is to be observed by the microwave radiometer, radiation received by the radiometer is partly due to self radiation by the object and partly due to reflective radiation originating from the surroundings of the object. (See Ulaby et al., *Microwave Remote Sensing Active and Passive*, Volume 1, 1981 Addison-Wesley Publishing Company, Redding, Mass.).

Radiometers fall into two broad classifications: the so-called total power radiometers and the so-called Dicke-type radiometers. For purposes of illustrating the present invention, a total power radiometer is considered. As described by Peckham in "An Optimum Calibration Procedure for Radiometers", International Journal of Remote Sensing, 1989, Volume 10, No. 1, pages 227-236, a total power radiometer consists of a receiver incorporating a band pass filter and a square-law detector and a post-detection integrator. The output signal from the post-detection integrator includes low frequency fluctuations arising from noise at the square-law detector. In microwave radiometers, the effect of these fluctuations on the interpretation of the output signal is very important. Temperature-induced gain and offset changes cause variation in the level of these low frequency fluctuations in the amplified system noise and hence in the square-law detector output. Thus, the radiometer gain and offset need to be periodically calibrated. A typical calibration system periodically switches the receiver input from the object to be observed to one or two calibration targets which provide standard signals with which to interpret the fluctuating output signals.

Recent investigations into passive microwave remote sensing of atmospheric precipitation have suggested that the difference between vertically and horizontally polarized brightness temperatures (brightness temperature is a term used to represent the intensity of radiation) contains useful information about the intensity of precipitation over oceans, and possibly the presence of aspherical particles in the cell tops of cloud formations. The polarization difference can also be used as an aid in detecting snow cover and discrimination between land and water backgrounds. The polarization difference can be detected with a dual linearly-polarized radiometer. In simple terms, this means that the signal received by the radiometer in one plane of polarization contains different information from that received by the radiometer in another plane, and that these "differences" can be used to evaluate the object being observed.

The polarization characteristics of a general radiation field can be completely and uniquely described by mathematics involving four Stokes' parameters, defined in an appropriate basis. The "basis" is a set of axes, or directions in space, along which the components of the electric field vectors of the radiation field lie. The measurement of these polarization parameters for naturally occurring radiation fields has been thoroughly studied within the context of radioastronomy, where the detection and measurement of the circularly polarized components of radiation fields has traditionally been of greatest interest. See, for example, M. H. Cullen, "Radio Astronomy Polarization Measurements", Proc. IRE, 46, pages 172-183, 1958. The reason for this is that many stellar objects emit radiation through nonthermal processes (e.g., synchrotron emission), which typically produce circularly polarized fields.

For the terrestrial troposphere and lower stratosphere, and for frequencies at which nonreciprocal propagation effects caused by the earth's magnetic field can be neglected, only the vertically and horizontally polarized Stokes' parameters (the brightness temperatures $T_v$ and $T_h$) have been shown to contain significant information. Hence, it is appropriate for instruments observing the earth and its atmosphere to measure, particularly, these two parameters. Because the vertical - horizontal (V-H) polarization basis requires a minimal number (2) of non-zero parameters to convey most of the information in such a radiation field, it is designated as the "natural" polarization basis.

The natural polarization basis is distinguished from the radiometer polarization basis, since the radiometer basis may or may not be aligned with the V- and H-axes. Ideally, the polarization basis of an airborne or spaceborne dual linearly-polarized radiometer should coincide with the natural polarization basis, so that the two radiometer channel outputs will be $T_v$ and $T_h$ (upon proper calibration). Without such coincidence of bases, the two channel outputs will be an undecipherable mixture of $T_v$ and $T_h$. Unfortunately, the need to image extended regions of the atmosphere by physically scanning the antenna beam makes it difficult to build an instrument which can retain polarization coincidence with the natural basis at every imaged spot. Consider, for example, two common scanning configurations for passive microwave imaging, conical and cross-track scanners. A conical scanner typically consists of a feedhorn and an off-axis parabolic antenna rotating about the feedhorn axis, thus sweeping the antenna beam through a cone-shaped swath. The cross-track scanner consists of a rotating scanning mirror oriented at a 45° angle with respect to the feedhorn axis. The resulting wedge-shaped path of the cross-track scanner typically is oriented transverse to the motion of the host aircraft or spacecraft, yielding a raster scan that is directed below the flight track of the host.

In their simplest configuration, both conical and cross-track scanners employ a feedhorn fixedly secured to the instrument platform. For dual linearly-polarized feedhorns, this results in the feedhorn polarization basis rotating (with respect to the natural basis) during the scan. The angular difference between the two bases is termed the polarization basis skew $\phi$ (the two bases coincide at $\phi=0$). To obtain a zero polarization skew at all scan angles, it has been known in the art to mechanically rotate the feedhorn along with the scanning reflector. However, alignment of the feedhorn and natural polarization bases by mechanical rotation is cumbersome, expensive, and somewhat unreliable, particularly in space.

In an unpublished paper of 1988 entitled "Microwave Precipitation Radiometer", G. S. Parks, T. C. Fraschetti, and D. C. Miller of the Jet Propulsion Laboratory, have suggested the possibility of eliminating the polarization skew throughout the scan of a conical scanner, while using an inexpensive fixed feed scanner, by electronically rotating the polarization basis. Their suggested method was based on the measurement of a cross-correlation between the two orthogonal linearly-polarized radiometer channels. The additional measurement made by this additional "U" channel is denoted "$T_{fU}$". However, the paper made no mention of three major issues concerning the practical implementation of electronic basis rotation. First, and perhaps most importantly, a scheme for calibration was not presented, and without calibration, the information obtained by the U channel cannot be relied upon. Secondly, a simple, practical implementation of the U channel correlator circuitry was not considered. Thirdly, an algorithm for transforming the measured polarization data back into the natural polarization basis was not discussed. In addition, the applicability of electronic polarization rotation to cross-track scanners was not considered.

Accordingly, it can be seen that a need yet remains for a dual-polarized cross-correlating radiometer and a method and apparatus for calibrating the same. It is to the provision of such that the present invention is primarily directed.

SUMMARY OF THE INVENTION

Briefly described, in a preferred form the present invention comprises a dual linearly-polarized radiometer for use with an antenna having a feedhorn, the radiometer comprising an electronic receiver means and including a first channel, a second channel, and a third, cross-correlating channel. The first and second channels each are electrically coupled with the feedhorn. Calibration means are provided in association with the feedhorn for calibrating the first channel, the second channel, and the third, cross-correlating channel.

Preferably, the calibration means comprises a polarized calibration device including two highly absorbing microwave blackbody loads and a polarization-splitting wire grid. One load is cooled to a low kinetic temperature and the other load is heated to a relatively high kinetic temperature. The wire grid combines the two load brightness temperatures into two orthogonal-linear polarizations. Each brightness temperature is precisely calculable from thermocouple or thermistor measurements of the hot and cold kinetic temperatures along with a priori knowledge of the transmission and reflection coefficients of the wire grid. Preferably, the polarized calibration device is mounted for rotation effectively about the feedhorn axis, thereby allowing the radiometer feed to be illuminated by a set of precisely known brightness temperature vectors. For example, observations can be made at two values of a load angle $\alpha$ and the resulting two U channel observations can be related to the load temperatures by the following equation:

$$\begin{pmatrix} v_U(\alpha = 45°) \\ v_U(\alpha = 135°) \end{pmatrix} = \bar{n}_v + \begin{bmatrix} \frac{T_{HOT} - T_{COLD}}{2} & 1 \\ \frac{T_{COLD} - T_{HOT}}{2} & 1 \end{bmatrix} \cdot \begin{pmatrix} g_{UU} \\ o_U \end{pmatrix}$$

Since the rank of the matrix in the above equation is two for $T_{HOT}$ not equal to $T_{COLD}$, the two load observations are sufficient to estimate the gain and offsets of the U channel. The A and B channels can be similarly calibrated using observations at $\alpha = 0°$ and $\alpha = 90°$.

In another preferred form, the invention comprises a method and apparatus for calibrating a cross-correlating channel of a radiometer. The apparatus for calibrating includes a first calibration load associated with the feedhorn of the radiometer and preferably includes a second calibration load. A polarizing member is positioned generally between the feedhorn and the first and second calibration loads. Means are provided for rotating the loads relative to the feedhorn or at least for rotating the polarization of the radiation energy waveforms received in the feedhorn from the calibration loads. Preferably, means are provided for maintaining the calibration loads at selected kinetic temperatures or for monitoring the kinetic temperatures of the calibration loads.

Preferably, in the method for calibrating the cross-correlating channel of the radiometer, the following steps are performed. When the cross-correlating channel is to be calibrated, the feedhorn is trained on first and second calibration loads, as for example by physically moving a splash plate reflector positioned to one side of the feedhorn. The first and second calibration loads are configured to present polarized radiation energy to the feedhorn. The calibration loads are rotated from an initial position ($\alpha = 0°$) to a number of angular positions, for example, to three additional angular positions ($\alpha = 45°$; $\alpha = 90°$; $\alpha = 135°$). At each of the angular positions, the voltage representing the brightness temperature of each of the calibration loads is measured. The kinetic temperature of the calibration loads during these voltage measurements is monitored and used, along with the voltages, to determine the gain and offset of the U-channel electronics, according to the equation set forth above. The gain and offset of the U-channel is used to interpret the measured voltages of the U-channel when imaging an object or scene in a following or preceding time interval to determine the brightness temperature of the object or scene. The A and B channels can be calibrated similarly. Preferably, the brightness temperatures (in the feedhorn basis) so obtained for the scene are then transformed into brightness temperatures in the natural basis, while using an error minimization technique.

Accordingly, it is a primary object of the present invention to provide a radiometer for use with an antenna which is capable of maintaining polarization coincidence with the natural basis of the image to be observed.

It is another object of the present invention to maintain natural basis polarization coincidence of a dual linearly-polarized radiometer while not requiring that the feedhorn be mechanically rotated as the antenna beam scans the object to be observed.

It is another object of the present invention to provide a method and apparatus for calibrating a cross-correlating channel of a dual-polarized cross-correlating radiometer.

It is another object of the present invention to provide a method and apparatus for calibrating a dual linearly-polarized cross-correlating radiometer which is effective and reliable in operation, particularly in space.

Other objects, features, and advantages of the present invention will become apparent upon reading the following specification in conjunction with the accompanying drawing figures.

DETAILED DESCRIPTION

Figure 1:
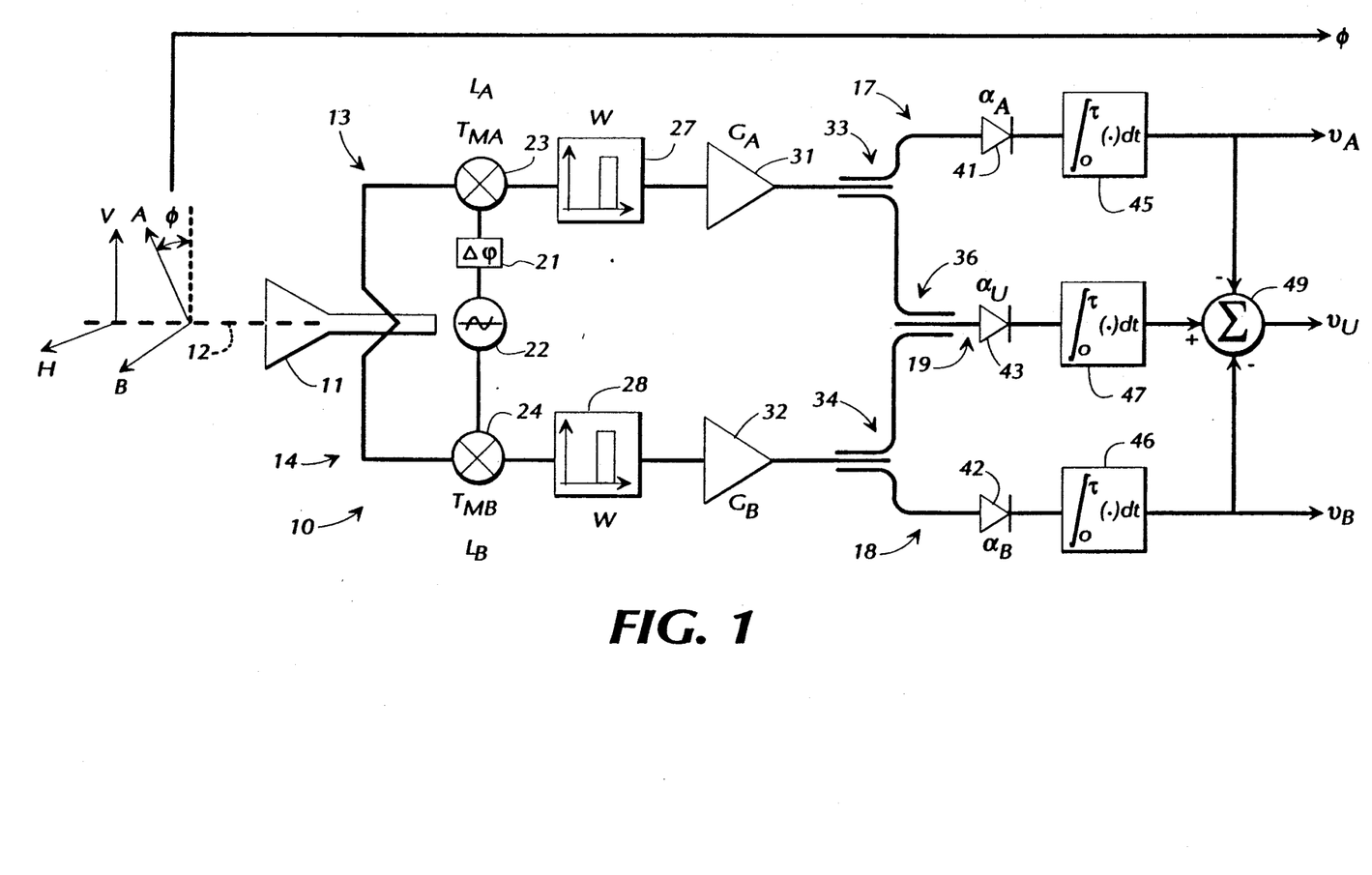
FIG. 1 is a schematic block diagram of a radiometer according to a preferred form of the invention.

Referring now in detail to the drawing figures, wherein like reference numerals represent like parts throughout the several views, FIG. 1 shows a block diagram of a radiometer 10 in a preferred, illustrative form of the present invention. The radiometer 10 is shown in association with an antenna feedhorn 11 for receiving incident microwave radiation centered about feedhorn axis 12. The feedhorn 11 can be of any of the known types, such as a corrugated scalar, pyramidal, "E-Plane sectoral", "H-Plane sectoral", or conical horns, so long as it is dual orthogonal-linearly polarized. Superheterodyne down-conversion stages 13 and 14 are coupled with the feedhorn 11 for first and second self-correlating channels 17 and 18, referred to throughout the following discussion as channels A and B, respectively, and for a cross-correlating channel 19 referred to herein as channel U.

A phase shifter 21 and a local isolator 22 are provided between mixers 23 and 24 for adjusting the phase shift $\phi$ to compensate for any RF (radio frequency) path-length differences between the A and B channels. Band-pass filters 27 and 28 and amplifiers 31 and 32 are positioned between the feedhorn 11 and the A, B and U channels 17-19 for conditioning and amplifying the electrical signals. The portion of the circuit of FIG. 1 to the left of and including amplifiers 31 and 32 is generally known in the art and further description of same is omitted.

Power splitters 33 and 34 couple the superheterodyne down conversion stages 13 and 14 (specifically, the outputs from the amplifiers 31 and 32) to the A, B, and U channels 17-19. Power splitter 33 splits off some, ideally 50%, of the electrical power provided from amplifier 31 and directs it to U channel 19, with the remaining power being directed to the A channel 17. Likewise, power splitter 34 splits off some, ideally 50%, of the electrical power from power amplifier 32 and directs it to the U channel 19, with the remaining electrical power being directed to the B channel 18. The electrical signals skimmed off from the A and B channels and directed to the U channel through the power splitters 33 and 34 are combined with power combiner 36 to form the sum of these signals in the U channel 19.

Square-law detectors 41, 42, and 43 are interposed in A, B, and U channels 17-19 and are associated with integrators 45, 46, and 47. The square-law detectors and integrators provide voltage outputs which are proportional to the signal power in the respective channels. The integrators 45-47 integrate the signals over time to obtain time-averaged values ("expected values") $V_A$, $V_B$, and $V_U$.

The voltage output from the integrator 45 represents the A channel voltage and the voltage output from integrator 46 represents the B channel voltage. The U channel voltage is obtained by subtracting the voltages from the A and B channel integrators 45 and 46 from the voltage output of the U channel integrator 47 using a summing junction 49.

Figure 2A:
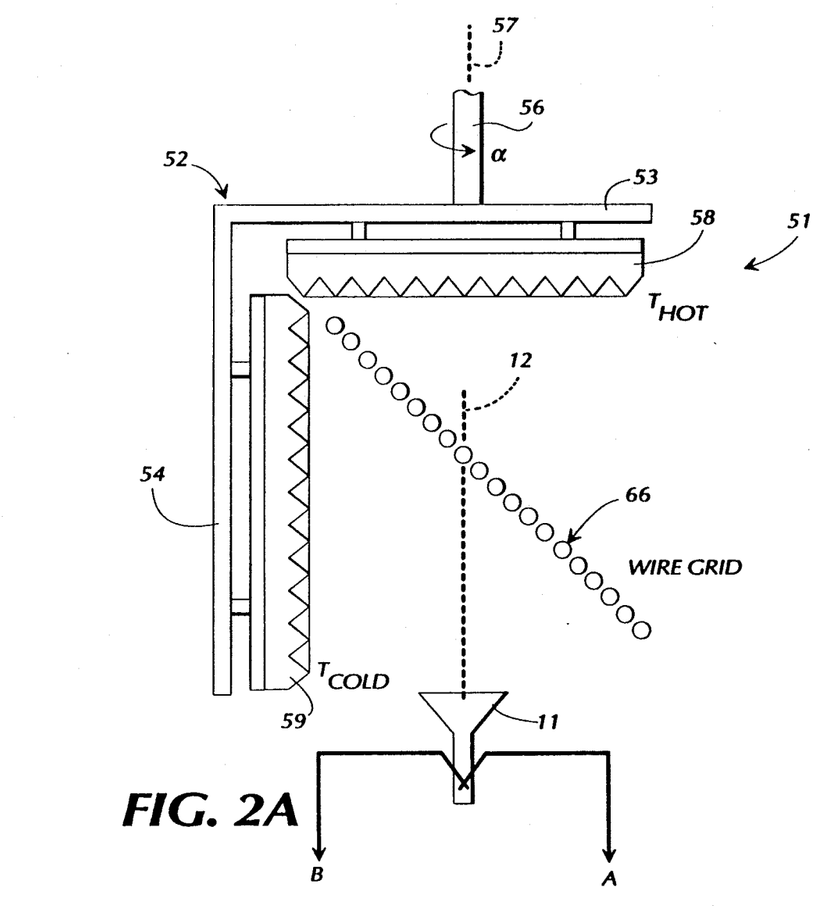
FIG. 2A is a schematic illustration of a calibration device for use with the radiometer of FIG. 1.

FIGS. 2A-2C and 3 schematically show a calibration device 51 for calibrating the three channels A, B, and U. As shown in FIG. 2A, the calibration device 51 includes a support frame 52 which is generally angled or L-shaped and comprises a first panel portion 53 and a second panel portion 54 mounted perpendicularly thereto. A shaft 56 is rigidly secured to panel portion 53, as by weldments as shown, for rotation about axis 57.

First and second highly absorbing microwave blackbody loads 58 and 59 are mounted to panel portions 53 and 54, respectively. The blackbody loads 58 and 59, of course, are not ideal blackbody loads, although that would be desired, since in actual construction the materials currently available to construct such blackbody loads do not behave as perfect absorbers and emitters of radiation energy.

In order to make effective use of the blackbody loads 58 and 59, it is important to closely monitor the kinetic temperature of the loads and to maintain the loads at different kinetic temperatures, preferably at least 80° K. apart. The kinetic temperature of the loads can be monitored with thermocouples or thermistors. To cool a load (borne on a spacecraft) to urge its kinetic temperature toward a desired kinetic temperature, one can expose the load to free space to radiate its thermal energy. For heating such a load, an electric resistive heater can be employed. Kinetic temperature differentials of less than 80° K. can be utilized, but require a longer interval of imaging the loads. Calibrating the cross-correlating channel with loads held at two different temperatures allows the equation set out in the "Summary of the Invention" (Equation 7 below) to be invertable.

Figure 2B:
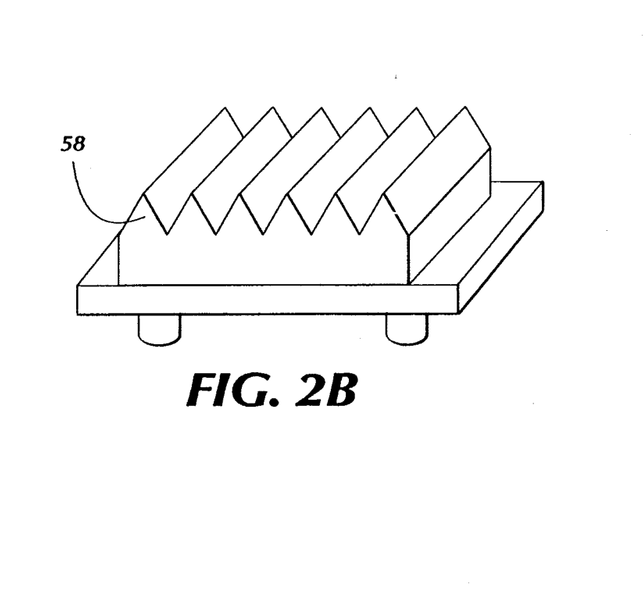
FIG. 2B is a schematic, perspective illustration of a load portion of the calibration device of FIG. 2A.
Figure 2C:
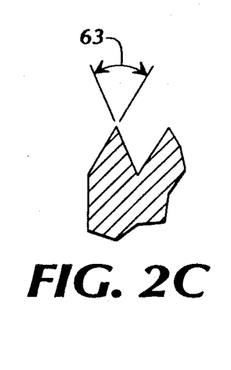
FIG. 2C is a side sectional view of a portion of the load portion of FIG. 2B.

As shown in FIG. 2B, the loads 58 and 59 have a series of elongated wedge-like rows or teeth extending parallel to one another. This elongate tooth pattern shown in FIG. 2B helps the loads to behave more like ideal black bodies. The angle 63 of the rows or teeth as depicted in FIG. 2C is approximately 30°.

Alternatively, the loads 58 and 59 can be constructed using a pyramid-type structure so that a large number of small pyramids are formed on the surface of each load and extend upwardly therefrom, as compared with having elongated wedge-like projections. In that event, the angle characterizing the pyramids of the hot load 58 and of the cold load 59 would be approximately 30°.

A polarization-splitting wire grid 66 made up of fine, electrically conducting, parallel wires is positioned to be at a 45° angle with respect to each of the loads 58 and 59, as will be discussed in more detail below. Other angles can be employed, as long as the grid is arranged to specularly reflect radiation energy from the side load 59 into the feedhorn. Such a polarization-splitting wire grid is available from Zax Millimeter Wave Corp. of San Dimas, Calif., and such grids have in the past been used for a broad variety of purposes.

Figure 3:
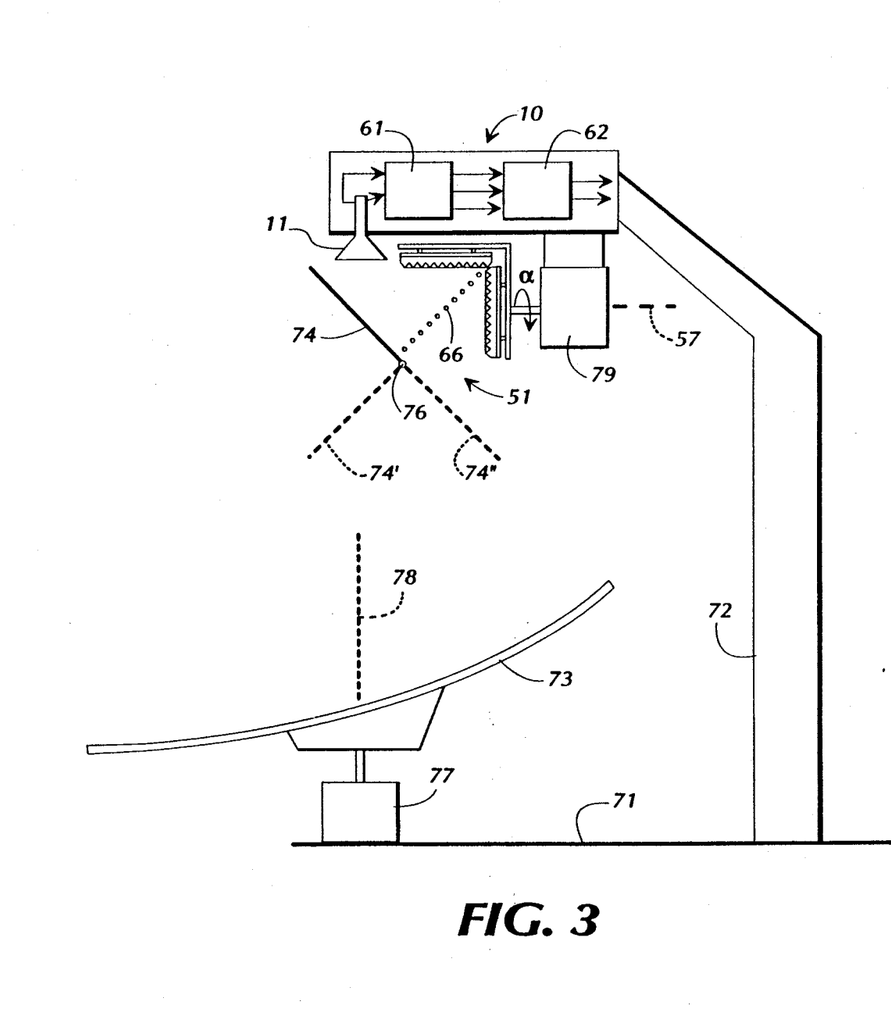
FIG. 3 is a schematic illustration of a radiometer including a calibration load according to FIGS. 1 and 2, shown mounted to one side of a parabolic reflector.

FIG. 3 schematically shows the radiometer 10 including the electronic circuit of FIG. 1 represented as box 61 and a digital computer and/or downlink interface represented as box 62. The radiometer 10 further includes the calibration device 51 incorporated into a remote sensing instrument indicated generally at 70. Such a remote sensing instrument 70 can be adapted to be mounted on a spacecraft, such as an earth satellite, or on an airplane for high-altitude flight. The remote sensing instrument 70 includes a support structure 71, 72, with support structure 72 supporting the radiometer 10 including the calibration device 51. The support structure 71 and 72 positions the radiometer 10 and the feedhorn 11 to one side of a parabolic or other type main scanning reflector 73 adapted for collecting microwave radiation energy emitted from the object or scene to be imaged and directing it to the feedhorn 11. The loads 58 and 59 of the calibration device 51 can be positioned to one side of the feedhorn 11 to allow energy to be directed from the parabolic reflector 73 to the feedhorn. A splash plate reflector or movable reflecting plate 74 is positioned in front of the feedhorn intermediate of the feedhorn and the parabolic reflector and is movably mounted for rotation about axle 76.

In the position indicated in solid line in FIG. 3, splash plate reflector 74 is useful for directing radiation energy from the loading device 51 to the feedhorn 11. In the intermediate position indicated at 74' in dash lines, the splash plate reflector is useful for directing radiation energy from, for example, free space to the feedhorn 11. Free space can be used as one of the calibration loads since the brightness temperature of space is very cold and very well known. In the opened position shown in dash lines and indicated at 74'', the splash plate reflector is positioned to allow the radiation reflected from the parabolic reflector 73 to be directed into the feedhorn 11.

A motor indicated generally at 77 is provided for rotating the parabolic reflector 73 about a central axis 78. Also, a motor 79 is provided for rotating the loads 58 and 59 about axis 57. Likewise, an unshown motor is provided for moving splash plate reflector 74 between the three positions shown in FIG. 3.

Figure 6:
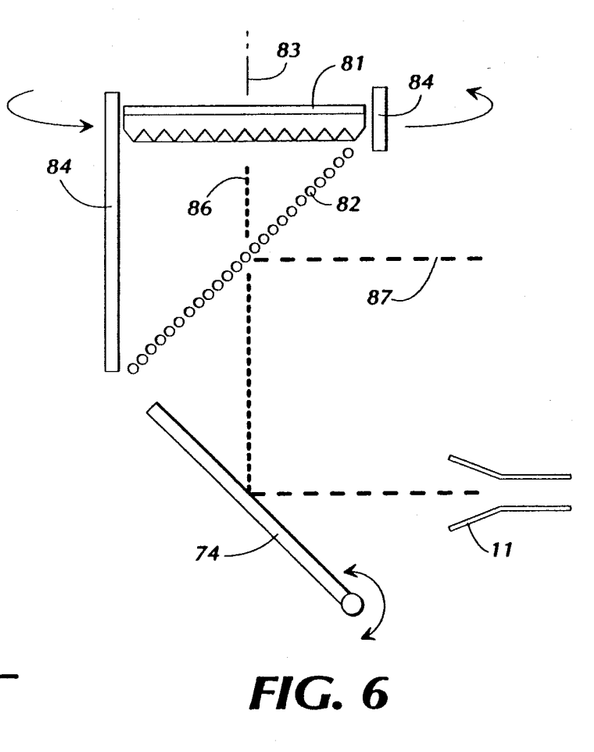
FIG. 6 is a schematic illustration of a calibration device for use with the radiometer of FIG. 1, according to a second preferred form of the invention.

FIG. 6 shows a modified form of the invention. In FIG. 6, a calibration load 81 is fixedly mounted to the platform vehicle, preferably a spaceborne satellite. The calibration load 81 is not rotated, but rather a polarizing grid 82 made up of fine wires is mounted for rotation about an axis 83. The grid of fine wires 82 is mounted to a rotatable drum 84, which is mounted for rotation about axis 83. Radiation energy emitted from the calibration load 81 is polarized as it passes along path 86 and through the polarizing grid 82 to the splash plate reflector 74 where it is directed to the feedhorn 11. Radiation energy also impinges on the calibration grid 82 from a second source, in this case from free space, along path 87 and is polarized and reflected by the grid 82 where it is directed to the splash plate 74 for directing the radiation energy to the feedhorn 11. Alternatively, a second calibration load can be positioned to direct the energy to the rotating polarizing grid 82. With this construction, the polarizing grid can be moved among several angular orientations, thereby effectively rotating the polarization of the energy impinging upon the feedhorn 11.

Figure 7A:
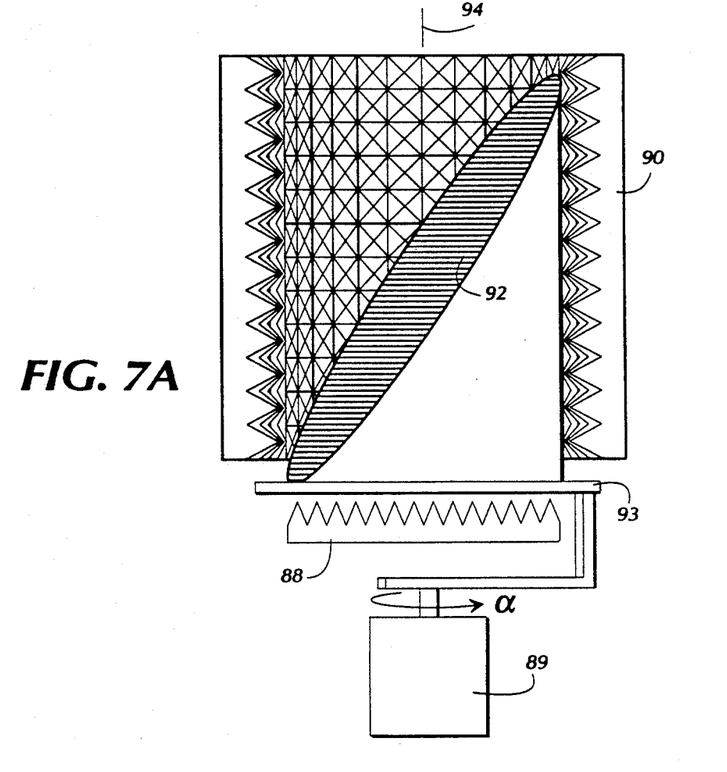
FIGS. 7A and 7B are schematic illustrations of a calibration device for use with the radiometer of FIG. 1, according to a third preferred form of the invention.
Figure 7B:
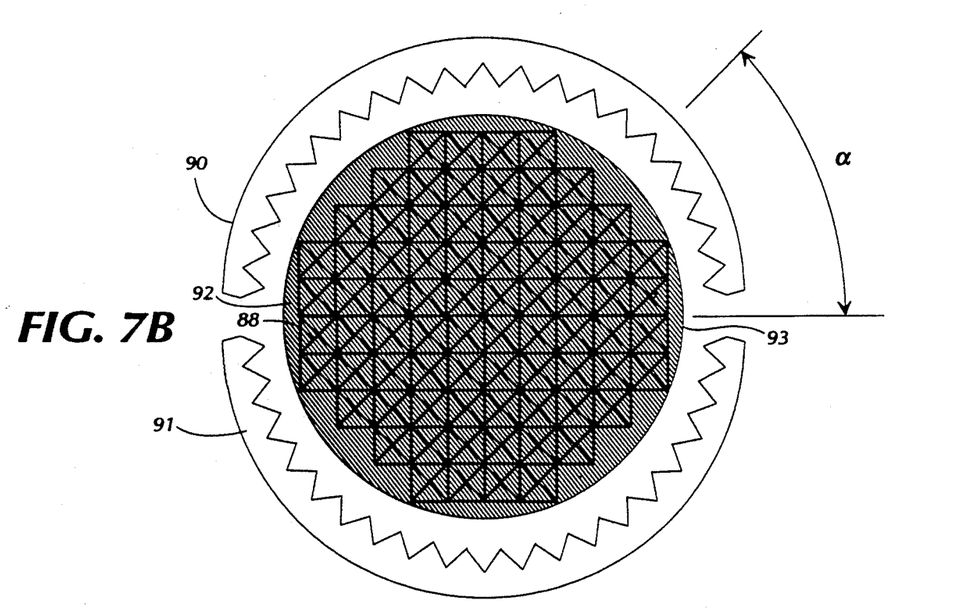

FIGS. 7A and 7B show a third modified form of the invention. A heated calibration load 88 is rigidly mounted to the platform vehicle, for example, using a shaft concentric with the axis of the motor 89. Two additional half-cylinder blackbody cold loads 90 and 91 are rigidly attached about the axis of rotation 94. The wire grid 92 is fixed to a rotating frame 93, which is rotated to specific angles $\alpha$ by the motor 89. The two half-cylinder cold loads 90 and 91 (A and B) are necessarily at different temperatures so as to provide additional calibration brightness temperatures. Free space can be substituted for one of the two cold loads 90 or 91.

OPERATION

In use, the apparatus described above can be used to calibrate the radiometer in the following manner. After viewing or imaging a scene or object for a period of time, the radiometer is prepared for calibration by interrupting the imaging of the scene by the feedhorn. The splash plate reflector 74 or other means is used to physically retrain the feedhorn on the calibration device, rather than on the scene or object to be imaged. After waiting a time to allow physical stabilization of the various mechanical elements, the voltage $V_u$ is measured at an initial position, $\alpha=0°$. The calibration device is then rotated to a position of $\alpha=45°$ and $V_u$ is measured at this new orientation. The calibration device, including the loads 58 and 59, is next rotated to a third position, $\alpha=90°$ and $V_u$ is measured at this orientation. Finally, the calibration device is rotated to a fourth position, $\alpha=135°$, and $V_u$ is measured at this fourth position.

While the calibration device is moved through these four orientations, the kinetic temperatures of the calibration loads 58 and 59 are monitored and averaged over time during the interval over which the calibration loads are repositioned. The two calibration loads 58 and 59 are maintained at different kinetic temperatures, preferably maintaining a temperature differential of at least 80° K. The voltages obtained at the various angular positions and the monitored kinetic temperatures of the two calibration loads are used to estimate the gains $g_{AA}$, $g_{BB}$, $g_{UU}$ and the offsets $O_A$, $O_B$, and $O_U$, according to a mathematical relationship which will be described in more detail below. The values $g_{UU}$ and $O_U$ are used to determine the brightness temperatures of the scanned images. An error minimization technique and a mathematical transform are used to transform the feedhorn brightness temperatures (in the feedhorn basis) of the image to the natural basis brightness temperatures, while minimizing error.

The linear transformation of brightness temperatures $\overline{T}$ from the natural polarization basis to feedhorn temperatures $\overline{T}_f$ in instrument's polarization basis is given according to Equation 1 below:

$$\begin{pmatrix} T_{fA} \\ T_{fB} \\ T_{fU} \end{pmatrix} = \begin{bmatrix} \cos^2\phi & \sin^2\phi & \frac{1}{2}\sin2\phi \\ \sin^2\phi & \cos^2\phi & -\frac{1}{2}\sin2\phi \\ -\sin2\phi & \sin2\phi & \cos2\phi \end{bmatrix} \begin{pmatrix} T_V \\ T_H \\ T_U \end{pmatrix}$$

$$= \overline{\overline{U}}(\phi) \cdot \overline{T}$$

In Equation 1, $T_{fU} = <\mathrm{Re}(E_A E_B)>$ is the cross-correlation between the two orthogonal linearly-polarized feedhorn modes (A and B), and $\phi$ is related to the scan angle of the main reflector 73. In practice, the measured value of $\overline{T}_f$ (denoted $\hat{\overline{T}}_f$) is corrupted by additive instrument noise due to calibration errors and finite integration time according to Equation 2 listed below:

$$\hat{\overline{T}}_f = \overline{\overline{U}}(\phi) \cdot \overline{T} + \overline{n}_T$$

With electronic polarization basis rotation, the brightness temperatures in the natural basis are estimated using the measured brightnesses in the feedhorn basis. The estimations of $T_V$ and $T_H$ are facilitated by the measurement of $T_{fU}$ along with $T_{fA}$ and $T_{fB}$.

The present invention addresses three issues concerning the practical implementation of electronic polarization basis rotation in both cross-track and conical scanners, namely:

1. A simple hardware configuration for the U-channel exhibiting acceptably small cross-talk and instrument noise;
2. Calibration of the U-channel; and
3. An algorithm for estimating the brightness vector $\overline{T}$ in the natural basis from the measured data $\overline{T}_f$ in the feedhorn basis.

To implement the U channel, the A and B IF signals are added prior to detection. The output voltage vector $\overline{v}$ is thus related to the feedhorn temperatures by Equation 3 below:

$$\begin{pmatrix} v_A \\ v_B \\ v_U \end{pmatrix} = \begin{bmatrix} g_{AA} & 0 & 0 \\ 0 & g_{BB} & 0 \\ g_{AU} & g_{BU} & g_{UU} \end{bmatrix} \cdot \begin{pmatrix} T_{fA} \\ T_{fB} \\ T_{fU} \end{pmatrix} + \begin{pmatrix} o_A \\ o_B \\ o_U \end{pmatrix} + \overline{n}_v$$

$$= \overline{\overline{g}} \overline{T}_f + \overline{o} + \overline{n}_v$$

In Equation 3, $\overline{\overline{g}}$ and $\overline{o}$ are instrument gain and offset parameters, respectively, and $\overline{n}_v = \overline{\overline{g}} \overline{n}_T$ is the instrument noise referred to the video outputs. Upon calibration, the feedhorn brightness temperatures are subsequently found from the output voltages according to Equation 4 below:

$$\hat{\overline{T}}_f = \overline{\overline{g}}^{-1}(\overline{v} - \overline{o})$$

In order to detect the relatively small cross correlation signal $T_{fU}$ in the presence of the larger signals $T_{fA}$ and $T_{fB}$, the video outputs of the A and B channels are subtracted from the U-channel video output. Provided that the total IF and video gains associated with the power splitters, square-law detectors, and integrators are matched to within approximately 0.5 decibels, the gain parameters $g_{UA}$ and $g_{UB}$ will be small compared to $g_{UU}$ (thus minimizing cross-talk) and instrument noise $n_T$ will be nearly white noise, with the co-variance defined according to Equation 5 below:

$$\overline{\overline{R}}_{\overline{n}_T \overline{n}_T} = \langle \overline{n}_T \overline{n}_T \rangle \approx \sigma_T^2 \overline{\overline{I}}$$

In Equation 5, $\overline{\overline{I}}$ is the identity matrix, and the $(\cdot)^t$ is the transpose operator. The noise standard deviation is given according to Equation 6 below:

$$\sigma_T = \frac{T_{SYS}}{\sqrt{W\tau}}$$

In equation 6, $T_{SYS}$ is the system noise temperature (receiver plus antenna), W is the IF bandwidth, and $\tau$ is the effective integration time. In practice, balancing is accomplished by video and IF component matching and by thermal stabilization.

Calibration of all three channels can be accomplished using the polarized calibration device 51. One of the loads (load 59) is cooled to a low kinetic temperature $T_{COLD}$, and the other load is heated to a high temperature $T_{HOT}$, where $T_{HOT} - T_{COLD}$ typically is 80° K. The wire grid 66 combines the two load brightness temperatures into two orthogonal linear polarizations. Each brightness temperature is precisely calculable from kinetic temperature measurements of $T_{HOT}$ and $T_{COLD}$ using, for example, thermistors or thermocouples, along with a priori knowledge of the wire grid transmission and reflection coefficients, the load emission and bistatic scattering properties, and the load background brightness temperatures.

By rotating the calibration device about the feedhorn axis (or at least effectively doing so with the use of the rotating grid 82 or 92), the radiometer feed can be illuminated by a set of known brightness temperature vectors. In practice, observations would be made at, for example, four values of the load angle $\alpha$: 0°, 45°, 90° and 135°. The four U-channel observations are related to the load temperatures by Equation 7 shown below:

$$\begin{pmatrix} v_U(\alpha = 0°) \\ v_U(\alpha = 45°) \\ v_U(\alpha = 90°) \\ v_U(\alpha = 135°) \end{pmatrix} = \overline{n}_v + \begin{bmatrix} 0 & 1 \\ \frac{T_{HOT} - T_{COLD}}{2} & 1 \\ 0 & 1 \\ \frac{T_{COLD} - T_{HOT}}{2} & 1 \end{bmatrix} \cdot \begin{pmatrix} g_{UU} \\ o_U \end{pmatrix}$$

Since the rank of the matrix in Equation 7 is two (2) when $T_{HOT}$ is not equal to $T_{COLD}$, the four load observations are sufficient to estimate the U-channel gain and offset, providing that the effects of any cross-talk due to small, residual imbalances in the IF and video circuitry are small. Calibration of the A and B channels proceeds similarly.

Figure 4:
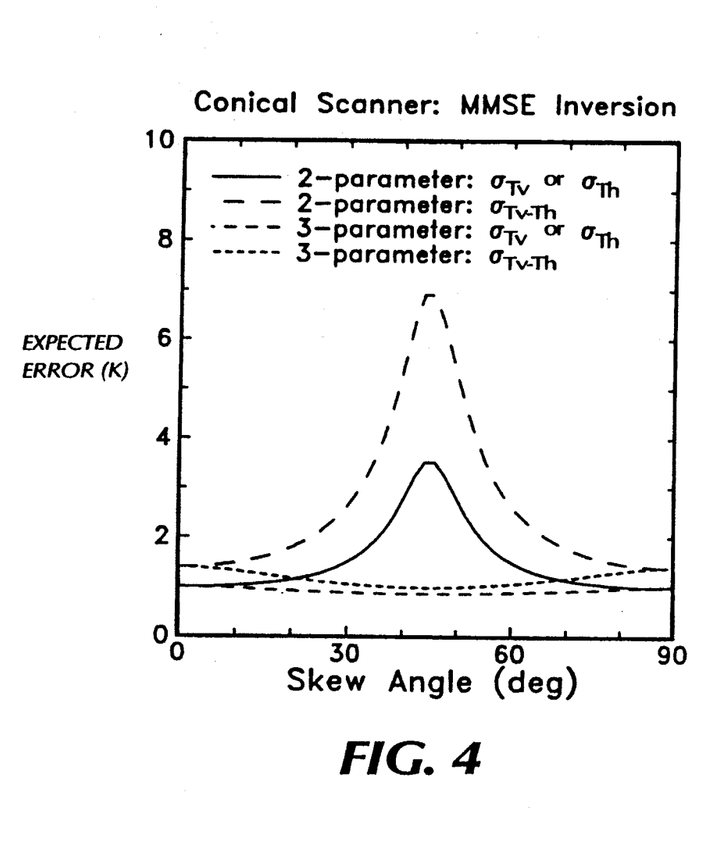
FIG. 4 is a graph of expected errors based on analysis for a conical scanner employing polarization basis rotation.
Figure 5:
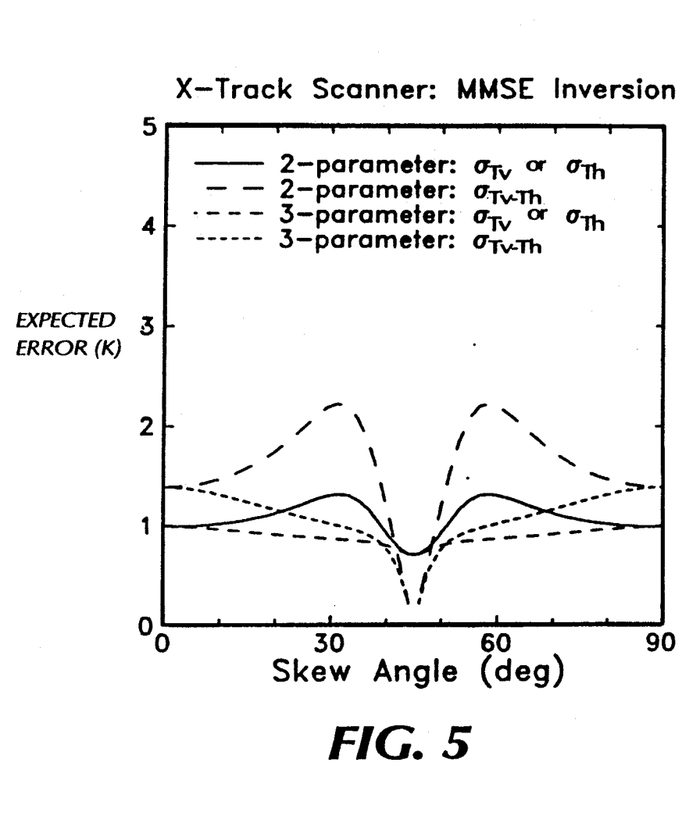
FIG. 5 is a graph of expected errors based on analysis for a cross-track scanner employing polarization basis rotation.

FIGS. 4 and 5 show graphs of expected performance of a conical scanner and a cross-track scanner, respectively, employing the present invention. The expected performance is based on the following analysis.

A linear estimator is used to infer $\overline{T}$ from the noisy measurements $\hat{\overline{T}}_f$:

$$\hat{\overline{T}} = \overline{\overline{D}}(\phi) \cdot (\hat{\overline{T}}_f - <\hat{\overline{T}}_f>) + <\overline{T}> \quad (8)$$

where $<\cdot>$ is the statistical mean. Using a minimum mean-square-error (MMSE) criterion, the optimum LMMSE estimator is:

$$\overline{\overline{D}} = \overline{\overline{R}}_{TT} \overline{\overline{U}}^t [\overline{\overline{U}} \overline{\overline{R}}_{TT} \overline{\overline{U}}^t + \overline{\overline{R}}_{n_T n_T}]^{-1} \quad (9)$$

where $\bar{\bar{R}}_{TT}$ is the covariance matrix for the brightness vector in the natural basis. The measurement error covariance matrix becomes:

$$\bar{\bar{R}}_{EE} = \langle(\hat{T} - \bar{T})(\hat{T} - \bar{T})'\rangle \qquad (10)$$
$$= (\bar{\bar{I}} - \bar{\bar{D}}\bar{\bar{U}})\bar{\bar{R}}_{TT}(\bar{\bar{I}} - \bar{\bar{D}}\bar{\bar{U}})' + \bar{\bar{D}}\bar{\bar{R}}_{n_Tn_T}\bar{\bar{D}}'$$

FIG. 4 shows LMMSE calculations of the expected errors in $\hat{T}_V$, $\hat{T}_H$, and $\hat{T}_{V-H}=\hat{T}_V-\hat{T}_H$ as a function of $\phi$ for a typical conical scanner. The calculations assume $\sigma T=1K$, a standard deviation of 50K for the vertical and horizontal brightness temperatures, and a standard deviation of 7K for the vertical-horizontal brightness difference $T_{V-H}=T_V-T_H$:

$$\bar{\bar{R}}_{TT} = \begin{bmatrix} 2500 & 2475.5 & 0 \\ 2475.5 & 2500 & 0 \\ 0 & 0 & 0 \end{bmatrix} \qquad (11)$$

These statistics are expected for conical swaths with $\sim 45°$ half-cone angles [2]. The vertical and horizontal electric fields are assumed to be uncorrelated ($T_U=0$), which is equivalent to the assumption that the V—H basis is the natural basis.

Calculations of the expected measurement error using the LMMSE estimator were performed for fixed-feed dual-polarization radiometers configured both with ("3-parameter") and without ("2-parameter") the U-channel (FIG. 3). The electronic polarization basis rotation technique suggests significantly smaller measurement errors in $\hat{T}_V$, $\hat{T}_H$, and the difference $\hat{T}_{V-H}$ than possible using a fixed-feed dual-polarized radiometer without the U-channel. The improvement is particularly striking for polarization skew angles near 45°. With the electronic technique, the measurement error is practically independent of $\phi$, and hence, independent of the scan position within the conical swath.

For a cross-track scanner, the antenna beam is oriented over a range of observation angles (typically from nadir $+45°$ to nadir $-45°$) during the scan. Near nadir, the brightness difference $T_{V-H}$ drops to zero, (i.e., $T_V$ and $T_H$ become indistinguishable). The correlation between $T_V$ and $T_H$ as a function of observation angle $\theta$ (measured with respect to nadir) can be modelled approximately by:

$$R_{TVTH}=2475.5+24.5\cos(2\theta) \qquad (12)$$

This relationship has been incorporated into the LMMSE estimator. Assuming that the nadiral scanner spot has a polarization skew angle $\phi=45°$, smaller measurement errors in $\hat{T}_{V-H}$ result near $\phi=45°$ than in the case of the conical scanner (FIG. 4, "3-parameter"). However, since the nadiral $T_V-T_H$ correlation can also be exploited using a conventional dual-polarized radiometer (with no U-channel) and a LMMSE estimator (FIG. 4, "2-parameter"), a smaller reduction in error is realized by the addition of the U-channel to a cross-track scanner than when added to a conical scanner.

The present invention provides a precision calibrated radiometer which is capable of maintaining polarization coincidence with the natural basis of the image to be observed. Also, the invention allows the natural polarization basis to be maintained coincident while not requiring that the feedhorn be mechanically rotated as the antenna beam scans the object or scene to be observed. The radiometer, according to the present invention, is effective and reliable in operation, particularly in space; this is so because the radiometer electronics does not have to be spun in order to maintain proper basis, thereby eliminating the need for slip rings and heavy-load bearings. Also, the feedhorn need not be spun. There also is less mass which needs to be spun, thereby having a lesser requirement for bearings. In general, the mechanical construction of the radiometer is accordingly simple and straightforward. Also, one advantage of the present invention is that by providing a practical method and apparatus for calibrating the U-channel, the construction and use of a practical cross-correlating radiometer is now possible. The present invention also provides performance over a very broad bandwidth and is suitable for use as a multi-band device (i.e., having a bandwidth of 9:1 or so) using a single multi-band feedhorn. Such broad bandwidths cannot be achieved using other electronic means, for example, Faraday rotators. Note that it is possible to electronically rotate the polarization basis by holding the blackbody loads fixed relative to the feedhorn and using a Faraday rotator positioned in the feedhorn to rotate the radiation energy received in the feedhorn relative to the feedhorn. However, this technique suffers from an undesirably narrow bandwidth.

It also is possible to replace one of the two blackbody loads with a view of cold space (2.7° K.). Also, one or both of the two blackbody loads can be replaced with active thermal noise sources (e.g., noise tubes).

In the case where the parameters $g_{UA}$ and $g_{UA}$ in Equation 3 are large, due to either misalignment or drift during operation, the preferred form of the invention shown in FIG. 7 can be used to determine all four parameters $g_{UA}$, $g_{UB}$, $g_{UU}$, and $O_U$ of the U-channel, as well as the gains and offsets of the A- and B- channels. Here, two cold loads, at two different temperatures, $T_{COLD,A}$ and $T_{COLD,B}$, are used to provide additional calibration temperatures essential for the determination of all four parameters. Cold space can be used for one of these two cold temperatures. For example, by rotating the wire grid to angles $\alpha=45, 90, 135, 180, 225, 270,$ and $315°$, the U-channel voltages can be related to the load temperatures by Equation 13 below:

$$\begin{pmatrix} v_U(\alpha = 0°) \\ v_U(\alpha = 45°) \\ v_U(\alpha = 90°) \\ v_U(\alpha = 135°) \\ v_U(\alpha = 180°) \\ v_U(\alpha = 225°) \\ v_U(\alpha = 270°) \\ v_U(\alpha = 315°) \end{pmatrix} = \bar{n}_v + \qquad (13)$$

$$\begin{bmatrix} T_{HOT} & T_{COLD,A} & 0 & 1 \\ \frac{T_{HOT} + T_{COLD,A}}{2} & \frac{T_{HOT} + T_{COLD,A}}{2} & \frac{T_{HOT} - T_{COLD,A}}{2} & 1 \\ T_{COLD,A} & T_{HOT} & 0 & 1 \\ \frac{T_{HOT} + T_{COLD,A}}{2} & \frac{T_{HOT} + T_{COLD,A}}{2} & \frac{T_{COLD,A} - T_{HOT}}{2} & 1 \end{bmatrix} \cdot \begin{pmatrix} g_{UA} \\ g_{UB} \\ g_{UU} \\ o_U \end{pmatrix}$$

-continued
$$\begin{bmatrix} T_{HOT} & T_{COLD,B} & 0 & 1 \\ \frac{T_{HOT} + T_{COLD,B}}{2} & \frac{T_{HOT} + T_{COLD,B}}{2} & \frac{T_{HOT} - T_{COLD,B}}{2} & 1 \\ T_{COLD,B} & T_{HOT} & 0 & 1 \\ \frac{T_{HOT} + T_{COLD,B}}{2} & \frac{T_{HOT} + T_{COLD,B}}{2} & \frac{T_{COLD,B} - T_{HOT}}{2} & 1 \end{bmatrix}$$

Since the rank of the matrix in Equation 13 is four, the four unknown parameters can be determined from the load observations. Similarly, the gains and offsets of the A- and B- channels can be determined.

Other ways in which a rank four observation matrix in Equation 13 can be obtained include views of the calibration load in either FIGS. 2 or 6 at four angles $\alpha = 0, 45, 90, 135$, along with an additional view of an unpolarized load, such as cold space. This view might be facilitated using the splash plate.

While the invention has been disclosed in preferred forms only, it will be obvious to those skilled in the art that many modifications, additions, and deletions may be made therein without departing from the spirit and scope of the invention as set forth in the following claims:

I claim:

1. A dual linearly-polarized radiometer for use with an antenna having a feedhorn, the radiometer comprising:
    electronic receiver means comprising a first channel, a second channel, and a third, cross-correlating channel, said first and second channels each being electronically coupled with the feedhorn; and
    thermal calibration means comprising thermal load means associated with the feedhorn for calibrating said first channel, said second channel, and said third, cross-correlating channel for standardizing measurements made by the radiometer, said thermal load means being positioned for emitting radiation toward the feedhorn.

2. A radiometer as claimed in claim 1 wherein said calibration means comprises a polarizing member.

3. A radiometer as claimed in claim 1 wherein said calibration means comprises two highly absorbent loads and a polarization splitting grid.

4. A radiometer as claimed in claim 3 wherein said two loads are mounted essentially perpendicularly to each other and oriented so that one of said loads effectively is perpendicular to the feedhorn.

5. A radiometer as claimed in claim 4 further comprising a support frame to which said loads are mounted and means for rotating said support frame about an axis extending through one of said loads.

6. A radiometer as claimed in claim 5 wherein said polarization grid is positioned generally between said two loads.

7. A radiometer as claimed in claim 6 wherein said polarization grid is oriented at approximately a 45° angle with respect to each of said two loads.

8. A radiometer as claimed in claim 1 wherein said electronic receiver means comprises a band pass filter means and an amplifier means.

9. A radiometer as claimed in claim 3 wherein said two loads are maintained at different kinetic temperatures.

10. A radiometer as claimed in claim 1 wherein said calibration means comprises a first calibration load means, a polarization-splitting grid for polarizing radiation traveling from said first calibration load means to the feedhorn, and means for reorienting the polarization of the radiation traveling to the feedhorn.

11. A radiometer as claimed in claim 10 wherein said means for reorienting comprises a means for rotating said first calibration load means.

12. A radiometer as claimed in claim 10 further comprising a second calibration load means positioned perpendicularly of said first calibration load means, wherein said means for reorienting comprises means for rotating said first and second calibration load means.

13. A radiometer as claimed in claim 6 wherein said polarization grid is oriented to specularly reflect radiation energy from one of said loads into the feedhorn.

14. A calibration device for use with a dual linearly-polarized cross-correlating radiometer having a feedhorn and adapted to be mounted to a host craft, for calibrating a cross-correlating channel of the radiometer, said calibration device comprising:
    a first calibration load means associated with the feedhorn of the radiometer;
    a second calibration load means associated with the feedhorn of the radiometer;
    a polarization-splitting member positioned for polarizing radiation energy traveling from said first and second calibration load means to the feedhorn; and
    means for rotating the polarization of the radiation energy traveling to the feedhorn.

15. A calibration device as claimed in claim 14 wherein said means for rotating comprises means for rotating said first and second calibration load means.

16. A calibration device as claimed in claim 14 wherein said first and second calibration load means comprises first and second calibration load members.

17. A calibration device as claimed in claim 16 wherein said first and second calibration load members are positioned perpendicularly to one another.

18. A calibration device as claimed in claim 17 wherein said polarization-splitting member comprises a polarization-splitting wire grid disposed generally intermediately of said first and second calibration load members.

19. A calibration device as claimed in claim 15 wherein said means for rotating said first and second calibration load means comprises a support frame to which said first and second load means are mounted and means for rotating said support frame about an axis extending through one of said load means.

20. A calibration device as claimed in claim 14 wherein one of said calibration load means comprises cold space.

21. A calibration device for use with a dual linearly-polarized cross-correlating radiometer having a feedhorn and adapted to be mounted to a host craft, the calibration device being adapted for calibrating a cross-correlating channel of the radiometer and comprising:
    a first calibration load means associated with the feedhorn;
    a polarization-splitting member positioned for polarizing radiation energy traveling from said first calibration load means to the feedhorn; and
    means for rotating said first calibration load means.

22. A calibration device as claimed in claim 21 further comprising a second calibration load means positioned perpendicularly of said first calibration load means and mounted to be carried in rotation therewith.

23. A method for calibrating a cross-correlating channel of a dual linearly-polarized cross-correlating radiometer having a feedhorn, the method comprising the steps of:
(a) training the feedhorn of the radiometer on a calibration device;
(b) measuring a voltage in the cross-correlating channel at a first angular position;
(c) rotating the calibration device to a second angular position;
(d) measuring a voltage in the cross-correlating channel at the second angular position;
(e) rotating the calibration device to a third angular position;
(f) measuring the voltage in the cross-correlating channel at the third angular position;
(g) rotating the calibration device to a fourth angular position;
(h) measuring the voltage in the cross-correlating channel at the fourth angular position;
(i) monitoring, while rotating the calibration device through the angular positions and measuring the voltages in the cross-correlating channel, the kinetic temperature of the calibration device; and
(j) using the measured voltages at the angular positions in conjunction with the kinetic temperature to estimate the gains and offset of the cross-correlating channel.

24. A method for calibrating a cross-correlating channel of a dual linearly-polarized cross-correlating radiometer having a feedhorn, the method comprising the steps of:
(a) directing polarized radiation energy to the feedhorn from first and second calibration loads;
(b) reorienting the polarization of the radiation energy received in the feedhorn from a first orientation to a second orientation;
(c) measuring a voltage, at each orientation, in the cross-correlating channel representing the cross-correlation of the radiation energy received in the feedhorn at the orientations;
(d) determining kinetic temperatures for the first and second calibration loads; and
(e) using the measured voltages at the orientations together with the kinetic temperatures to estimate the gains and offset of the cross-correlating channel.

25. A method as claimed in claim 24 wherein the step of reorienting comprises rotating the first and second calibration loads relative to the feedhorn.

26. A method as claimed in claim 24 wherein the step of reorienting comprises rotating a polarization grid disposed generally between the calibration loads and the feedhorn.

27. A method as claimed in claim 25 wherein the step of rotating comprises moving the calibration loads from a first orientation to a second orientation at an angle of 45° thereto, moving the calibration loads to a third orientation at an angle of 90° relative to the first orientation, and moving the calibration loads to a fourth orientation at an angle of 135° relative to the first orientation.

28. A method as claimed in claim 24 wherein the step of using measured voltages together with kinetic temperatures to estimate gains and offset is carried out essentially according to the following equation:

$$\begin{pmatrix} v_U(\alpha = 45°) \\ v_U(\alpha = 135°) \end{pmatrix} = \bar{n}_v + \begin{bmatrix} \dfrac{T_{HOT} - T_{COLD}}{2} & 1 \\ \dfrac{T_{COLD} - T_{HOT}}{2} & 1 \end{bmatrix} \cdot \begin{pmatrix} g_{UU} \\ o_U \end{pmatrix}.$$

* * * * *